United States Patent [19]

Sorathia et al.

[11] Patent Number: 5,237,018

[45] Date of Patent: *Aug. 17, 1993

[54] INTERPENETRATING POLYMER NETWORK ACOUSTIC DAMPING MATERIAL

[75] Inventors: Usman A. Sorathia, Arnold; William L. Yeager, Queen Anne; Timothy L. Dapp, Bowie, all of Md.

[73] Assignee: The United States of America as represented by the Secretary of the Navy, Washington, D.C.

[*] Notice: The portion of the term of this patent subsequent to Jul. 6, 2010 has been disclaimed.

[21] Appl. No.: 751,352

[22] Filed: Aug. 28, 1991

[51] Int. Cl.$^5$ .............................................. C08F 18/04
[52] U.S. Cl. ...................... 525/454; 528/75; 528/76; 528/112; 525/28; 525/131; 525/903; 525/455
[58] Field of Search ................ 525/454, 455

[56] References Cited

U.S. PATENT DOCUMENTS 4,532,316  7/1985  Henn .................................. 528/59
4,824,919  4/1989  Baker et al. ...................... 522/502
5,102,924  4/1992  Williams et al. .................. 522/4

Primary Examiner—James J. Seidleck
Assistant Examiner—Mary Critharis
Attorney, Agent, or Firm—Luther Marsh; Gary G. Borda

[57] ABSTRACT

Improved acoustic damping materials comprise interpenetrating polymer networks having a soft polymer component and a hard polymer component. The soft polymer component, constituting from 75 to 95, preferably 90, percent by weight of the material, is made by polymerizing an aromatic diisocyanate with a polyalkylene ether glycol, and the hard polymer component is a vinyl ester polymer made by polymerization of the acrylate or methacrylate ester of the diglycidyl ether of a polyphenol. The curing of the mixture is carried out at room temperature in presence of a peroxide and an aromatic amine. The mixture of ingredients, while liquid, may be injected into mechanical devices, such as shafts of rotating equipment whose noise is to be dampened, and allowed to cure therein.

8 Claims, 1 Drawing Sheet

INTERPENETRATING POLYMER NETWORK ACOUSTIC DAMPING MATERIAL

The invention described herein may be manufactured and used by or for the Government of the United States for governmental purposes without the payment of any royalties thereon or therefor.

BACKGROUND OF THE INVENTION

1. Field of Invention

This invention relates to polymer compositions, and methods of preparing them, having improved acoustic damping properties. More specifically, it relates to polymer mixtures comprising two components, a soft polymer component and a hard polymer component, which are intimately mixed on a molecular scale, such mixtures being referred to as "interpenetrating polymer networks."

2. Description of the Prior Art

Interpenetrating polymer networks having improved acoustic damping characteristics are known to the art.

U.S. Pat. No. 3,833,404 discloses interpenetrating polymer networks to be used for surface layers or coatings for damping vibrations or noise-emitting surfaces. The material consists of poly ethylacrylate cross-linked with a polyglycol dimethacrylate, and polystyrene cross-linked with divinylbenzene.

U.S. Pat. No. 4,302,553 discloses a number of interpenetrating polymer networks having improved tensile strength and swelling properties in presence of solvents, including combinations of polyurethanes with polyacrylates, polyepoxides, polyesters, styrene-butadiene polymers and polydimethyl siloxanes.

U.S. Pat. No. 4,342,793 describes curable resin compositions for protective surface coatings consisting of interpenetrating polymer networks prepared from saturated polyols, acrylate and methacrylate esters, and polyisocyanates, by radiation and thermal curing.

U.S. Pat. Nos. 4,618,658 and 4,719,268 describe polymer modified epoxy resin compositions comprising the copolymerization product of an epoxy resin wherein part of the epoxide groups have been modified to provide polymerizable ethylenic unsaturation; vinyl-terminated urethane oligomer; and a polymerizable ethylenically unsaturated compound such as styrene or an acrylate ester.

U.S. Pat. No. 4,742,128 discloses compositions for molded products consisting of an interpenetrating polymer network comprising a polyamide and a polyurethane.

U.S. Pat. No. 4,752,624 describes an interpenetrating polymer network for selective permeation membranes comprising a hydrophilic and a hydrophobic polymer component. The hydrophylic component is made from hexamethylene diisocyanate and polyethylene ether glycol, and cross-linked with trimethylolpropane. The hydrophobic polymer component is polystyrene cross-linked with divinylbenzene.

U.S. Pat. No. 4,766,183 discloses a heat-curable composition comprising a urethane/epoxy/silicone interpenetrating polymer network.

U.S. Pat. No. 4,824,919 describes vinyl ester/styrene composition flexibilized by the addition of a small amount of polyurethane.

U.S. Pat. No. 4,902,737 discloses a resin having improved impact properties comprising an aromatic carbonate resin/polyester blend modified by the addition of a first elastomeric phase of cross-linked polyacrylate, and a second phase of cross-linked styrene/acrylonitrile.

U.S. Pat. No. 4,923,934 discloses a coating having improved flexibility, resistance to chemical attack and corrosion, and adhesion, consisting of an interpenetrating polymer network including a blocked urethane prepolymer, a polyol, an epoxy resin, and an epoxy catalyst.

U.S. Pat. No. 4,957,981 describes a polymeric material to be used for optical products such as lenses, goggles, and watch covers comprising an interpenetrating polymer network of a polyol(allylcarbonate) and an epoxy resin.

U.S. Pat. No. 4,992,506 provides a molding composition having improved flexural modulus and softness (lower modulus) comprising an interpenetrating polymer network of one or more thermoplastic copolyetheresters, one or more aromatic thermoplastic polyesters, a rubbery polymer comprising cross-linked (meth)acrylate, and an interpenetrating cross-linked styrene resin; and, optionally, a mineral filler.

SUMMARY OF THE INVENTION

The acoustic damping properties of viscoelastic polymeric materials render them most effective in their glass transition temperature range where the material changes from hard, glass-like to soft, rubbery consistency. For a specific polymeric material, the glass transition temperature range is centered about a characteristic temperature for that material. For most polymeric materials, the glass transition temperature range is of the order of 20 degrees C. (see curve labeled 100/0 in FIG. 1). This temperature range is where the polymeric material provides its maximum acoustic damping, however, it frequently occurs at temperatures which are either lower or higher than the temperature range in which a high degree of acoustic damping is desired from an applications standpoint. Efforts have therefore been made to broaden the glass transition temperature range and to shift it to a designated temperature range such that a high degree of acoustic damping is achieved at temperatures at which acoustic damping ordinarily is low.

The present invention provides a room temperature cured, viscoelastic material interpenetrating polymer network having a broadened glass transition temperature range and, therefore, improved acoustic damping over a broad range of temperatures (see curve labeled 90/10 in FIG. 1). To provide noise and vibration damping, the polymer precursors of the present invention, while in a liquid state, may be injected into free spaces in mechanical devices and cured therein. Because the invention may be injected into mechanical devices already in use, room temperature curing over a period of several hours facilitates use of the invention.

The ability of viscoelastic materials to dampen noise and vibration is related to their complex Young's modulus $$E^* = E' + iE'',$$

where $E'$ is the real, elastic, or in-phase modulus, and $E''$ is the imaginary, viscous, loss, or out-of-phase modulus; $i = \sqrt{-1}$. A measure of the mechanical energy dissipation as heat in a viscoelastic material is the ratio $E''/E'$, which is also referred to as the damping factor, tangent delta. It is experimentally determined at 10 Hz with a mechanical thermal analyzer, such as the Polymer Laboratory Dynamic Mechanical Thermal Analyzer. All polymer systems exhibit a maximum value for tan delta, and hence maximum vibration damping, at their glass transition temperature.

Interpenetrating polymer networks are chemically dissimilar cross-linked polymer chains which have substantially no chemical bonding between them. They are prepared by allowing two sets of polymer precursors to polymerize in each other's presence, either simultaneously or sequentially, whereby two cross-linked polymer networks form which are intimately entangled with each other on a molecular scale.

It has now been found that, by the choice of appropriate polymer components and polymer component ratios, interpenetrating polymer networks may be produced whose glass transition is broadened and shifted to a preferred temperature range. Such interpenetrating polymer networks, as for example the interpenetrating polymer network of the present invention, have increased damping factors in the temperature range in which they are to be used for acoustic damping. Moreover, the chemical precursors of such polymers, while in a liquid state, may be injected into mechanical devices, such as shafts of rotating equipment, so as to cure and harden in place with the exact shape and dimensions required for optimum acoustic damping.

The object of this invention therefore is to provide interpenetrating polymer networks having novel compositions, broadened glass transition temperature ranges, and increased acoustic damping factors in designated temperature ranges, which are injected into mechanical devices whose noise is to be dampened. A further object of this invention is to provide processes for preparing such interpenetrating polymer networks.

One component of the interpenetrating polymer networks of this invention is a soft polymer, and the other component is a hard polymer. The soft polymer component of the interpenetrating polymer network of this invention is a polyurethane prepared from one or several diisocyanates and a polyalkylene ether glycol, cross-linked using a polyol. The diisocyanates most commonly used are 4,4'-diphenylmethane diisocyanate, and 2,4 and 2,6-toluene diisocyanate, the latter two most commonly as an isomer mixture. Polyalkylene ether glycols such as polyethylene ether glycols, polpropylene ether glycols, and poly tetramethylene ether glycols may be used, the latter, with a molecular weight between about 650 and about 2000, being preferred. The polyurethane precursors are polymerized in the presence of a chain extender and a cross-linking agent. As a chain extender, 1,4-butanediol is preferred. Cross-linking is achieved by the addition of 1,1,1-trimethylol propane.

The hard polymer component of the interpentrating polymer network of this invention is a vinyl ester polymer produced by polymerization of a vinyl ester resin such as the ester of an ethylenically unsaturated carboxylic acid, e.g. acrylic or methacrylic acid, and a polyglycidyl ether of polypenols such as 2,2-bis(4-hydroxyphenyl) propane (bisphenol A); 4,4'-dihydroxy diphenylmethane; 4,4'-dihydroxy benzophenone; 1,1-bis(4-hydroxyphenyl) ethane, and other similar polyphenols. The polygycidyl ethers are made by reacting epichlorohydrin with the polyphenols in presence of alkali. The resin mixture may contain 40–50 weight percent of styrene monomer. A commercially available vinyl ester resin of this type, Hetron 980, is made by Ashland Chemical.

The vinyl ester polymer precursors are polymerized in the presence of promoters and curing agents, such as aromatic amines and peroxides, dimethyl aniline and benzoyl peroxide being preferred. The mixture is then cured at room temperature for twelve to twenty hours, preferably about sixteen hours.

The interpenetrating polymer network of this invention has an extended glass transition range when the weight percentage of soft polymer component ranges from 75 to 95, and that of the hard polymer component ranges from 25 to 5. Broadened glass transition temperature is achieved by virtue of the vinyl ester polymer being cross-linked in the presence of polyurethane, but without chemical interference by the polyurethane, to produce microphase separation between the polyurethane and vinyl ester components. The polyurethane precursors are polymerized in the presence of their chain extender and cross-linking agent and the vinyl ester polymer precursors are polymerized in the presence of their promoter and curing agent, however, no cross-linking results between the polyurethane and the vinyl ester polymer. This result produces a morphology of polymer networks with microphase domains and entanglement on a molecular scale that produce broad glass transition temperatures. Furthermore, as shown in FIG. 1., the peak damping (peak tan delta) is increased over that of pure polyurethane when the weight ratio of soft polymer to hard polymer is about 90/10. The results is a polyurethane/vinyl ester interpenetrating polymer network having improved acoustic damping characteristics over a broad temperature range. Thus the invention allows damping over a broad temperature range without the necessity of changing materials for different uses in different temperatures.

DESCRIPTION OF PREFERRED EMBODIMENTS OF THE INVENTION

Figure 1:
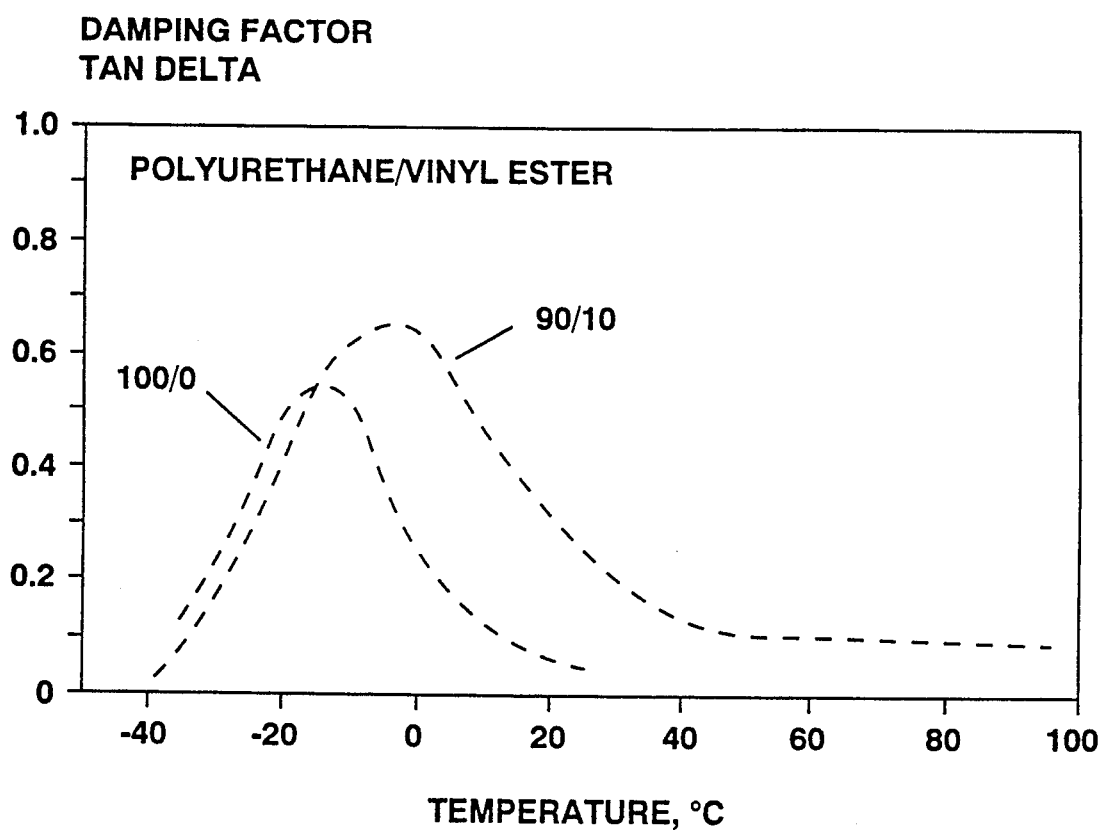
FIG. 1 illustrates the damping factor, tangent delta, as a function of temperature, for interpenetrating polymer networks according to this invention as well as that of pure polyurethane polymer.

In the following detailed description of the preferred embodiments of this invention, the following abbreviations will be used to identify the materials used:

Resin RP-6401, 4,4'-diphenylmethane diisocyanate, Ciba-Geigy Corporation

Hardener RP-6401, polyethylene ether glycol, molecular weight about 1000, containing minor amounts of 1,4-butanediol and 1,1,1-trimethylol propane, Ciba-Geigy Corporation Hetron 980, vinyl ester resin, Ashland Chemical DMA, dimethyl aniline, Ashland Chemical ATC, benzoyl peroxide, Luperco ATC, Lucidol Pennwalt

EXAMPLE 1

This example illustrates the preparation of an interpenetrating polymer network according to this invention in which the weight percentage of soft polymer component is 90. In a first vessel, 13.2 parts of Hetron 980 are mixed with 0.014 parts of DMA and the mixture is degassed under vacuum for about one minute, or until all foam disappears, in order to remove dissolved and entrained air. 27.5 parts of Resin RP-6401 are added and the batch is mixed and further degassed under vacuum for about ten minutes.

In a second vessel, 100 parts of Hardener RP-6401 are mixed with 0.26 parts of ATC. The contents of the second vessel are poured into the contents of the first vessel with agitation, and the mixture is further degassed under vacuum. The mixture is allowed to cure in a mold for 12 to 20 hours at room temperature. The damping factor, tan delta, of this interpenetrating polymer is shown in FIG. 1 with the designation "90/10". Also shown is the damping factor for pure polyurethane polymer, with the designation "100/0". It is apparent that the "90/10" interpenetrating polymer network represents a great improvement in damping factor over the pure polyurethane polymer.

EXAMPLE 2

The mixture prepared as described in Example 1 is drawn by vacuum into the annular space between a cylindrical shaft and a sleeve bearing. The mixture is allowed to cure and harden at room temperature for 12-20 hours. It forms a sound-absorbing sleeve around the shaft.

Other modifications of this invention will be apparent to those skilled in the art, all falling within the scope of the invention as described herein and claimed in the following claims.

What is claimed is:

1. An acoustic damping material providing improved acoustic damping for a mechanical device into which the acoustic damping material is injected, comprising:
   an interpenetrating polymer network having a soft polymer component made of polyurethane, said soft polymer component comprising from about 75 to about 95 weight percent of said interpenetrating polymer network, and a hard polymer component made of a vinyl ester polymer, said hard polymer component comprising from about 25 to about 5 weight percent of said interpenetrating polymer network;
   said soft polymer component and said hard polymer component being made from liquid precursors said liquid precursors being injected into the mechanical device whose noise is to be damped; and
   each of said soft polymer component and said hard polymer component being polymerized in the presence of the other and being allowed to cure at room temperature from about 12 to about 20 hours within the mechanical device in presence of a peroxide and an aromatic amine.

2. An acoustic damping material in accordance with claim 1 wherein said polyurethane is made by polymerization of an aromatic diisocyanate and a polyalkylene ether glycol in the presence of 1,4-butanediol and 1,1,1-trimethylol propane and said vinyl ester polymer is made by polymerization of a vinyl ester resin comprising the ester of an ethylenically unsaturated carboxylic acid and the diglycidyl ether of a polyphenol.

3. An acoustic damping material in accordance with claim 2 wherein said aromatic diisocyanate is selected from the group consisting of 4,4'-diphenylmethane diisocyanate, 2,4,-toluene diisocyanate, 2,6,-toluene diisocyanate, and any mixture thereof.

4. An acoustic damping material in accordance with claim 2 wherein said polyalkylene ether glycol is selected from the group consisting of polyethylene ether glycol, polypropylene ether glycol and polytetramethylene ether glycol.

5. An acoustic damping material in accordance with claim 4 wherein said polytetramethylene ether glycol has a molecular weight between about 650 and about 2000.

6. An acoustic damping material in accordance with claim 2 wherein said ethylenically unsaturated carboxylic acid is selected from the group consisting of acrylic acid and methacrylic acid.

7. An acoustic damping material in accordance with claim 2 wherein said polyphenol is selected from the group consisting of 2,2-bis(4-[hyroxyphenyl]hydroxphenyl)propane, 4,4'-dihydroxydiphenylmethane, 4,4'-dihydroxy benzophenone, and 1,1-bis(4hydroxyphenyl)ethane.

8. An acoustic damping material in accordance with claim 1 wherein said peroxide is benzoyl peroxide, and said aromatic amine is dimethyl aniline.

* * * * *